United States Patent [19]

Holland et al.

[11] 3,719,875

[45] March 6, 1973

[54] BRUSHLESS D.C. MOTOR USING MAGNETO RESISTOR SENSING MEANS

[75] Inventors: Eugene E. Holland, Charlottesville; Rex O. Jones, III, Burgess, both of Va.

[73] Assignee: Sperry Rand Corporation, New York, N.Y.

[22] Filed: Jan. 26, 1972

[21] Appl. No.: 220,932

[52] U.S. Cl. ................. 318/254, 318/439, 318/138
[51] Int. Cl. ............................................. H02k 29/00
[58] Field of Search ..................... 318/138, 254, 439

[56] References Cited

UNITED STATES PATENTS

| | | | |
|---|---|---|---|
| 3,505,717 | 2/1967 | Weiss | 318/254 |
| 3,476,997 | 11/1969 | Otzipka et al. | 318/254 |
| 3,671,833 | 6/1972 | Rukes | 318/138 |
| 3,549,967 | 12/1970 | Ucmura | 318/254 |

*Primary Examiner*—G. R. Simmons
*Attorney*—Howard P. Terry

[57] ABSTRACT

A brushless d.c. motor having a diametrically magnetized permanent magnet rotor and a plurality of stator windings disposed around the inner periphery of the motor frame, employs magneto resistors placed intermediate adjacent windings to trigger commutating switches that control energization of the individual stator windings. All stator windings are wound to attract the same selected magnetic pole of the rotor. The rise in resistance of a magneto resistor when subjected to flux from the selected magnetic pole is used to close the switch controlling the following stator winding in the desired sequence. The switch also produces a disabling signal that triggers a silicon controlled rectifier in the preceding switch so as to open this switch. The magneto resistor controlling the disabled switch is disposed diametrically opposite the energized stator winding so that when the flux from the non-selected rotor pole intercepts this resistor, the associated switch remains clamped in the open condition.

8 Claims, 3 Drawing Figures

PATENTED MAR 6 1973

3,719,875

BRUSHLESS D.C. MOTOR USING MAGNETO RESISTOR SENSING MEANS

BACKGROUND OF THE INVENTION

1. FIELD OF THE INVENTION

The invention relates to brushless d.c. motors and more specifically to brushless d.c. motors using magnetic rotor position sensing means.

2. Description of the Prior Art

Brushless d.c. motors have found wide application in recent years. Various sensing means have been utilized for detecting rotor position in such motors. Photo-optical means, for instance, are widely used for this purpose.

Photo-optical means, however, are not suitable for some hostile environments so that alternative means must be adopted.

Wound resolvers have also been used for rotor position sensing. Such resolvers, however, are expensive so that their use is limited to applications in which such complexity and expense can be tolerated.

Hall effect devices have also been used for rotor position sensing. Although these devices operate effectively, they require additional circuitry since they essentially essenially active devices.

SUMMARY OF THE INVENTION

Stator windings of a brushless d.c. motor are disposed around the periphery of the motor frame and energized through individual commutating switches in response to a rise in resistance experienced by associated magneto resistors when subjected to flux from a selected magnetic pole of the rotor. Closure of any switch generates a disabling signal that opens the previous switch in the desired sequence. The switches are rendered immune to the effect of the rise in resistance of the individual magneto resistors when exposed to flux from the non-selected magnetic pole of the rotor by positioning the resistors so that this rise in resistance occurs while the associated switch is disabled.

DESCRIPTION OF THE PREFERRED EMBODIMENT

The brushless d.c. motor of the present invention uses commercially available magneto resistors for rotor position sensing. As presently preferred, such commercially available magneto resistors may be obtained in the form of a flat rectangular element that may conveniently be inserted between the frame of the brushless d.c. motor and the rotating permanently magnetized rotor. As is well known in the art, magneto resistors are characterized in that they exhibit a resistance that increases when the unit is exposed to magnetic flux. This phenomenon is used in the present invention by exposing the magneto resistors to a flux from the permanently magnetized rotor of a brushless d.c. motor. As a magnetic pole of the rotor approaches the magneto resistor during normal rotation, the resistance of the magneto resistor rises to a maximum peak and then decreases to a minimum value as the magnetic pole recedes. The magneto resistors have proven to be useful in such applications since they are passive devices and require no auxiliary excitation apparatus. This is particularly useful in situations in which compactness, reliability and low cost are important. However, since a magneto resistor when exposed to flux from a rotating permanent magnet rotor cannot distinguish between north and south magnetic poles, some means must be found to eliminate the effect of one of these poles.

Figure 1:
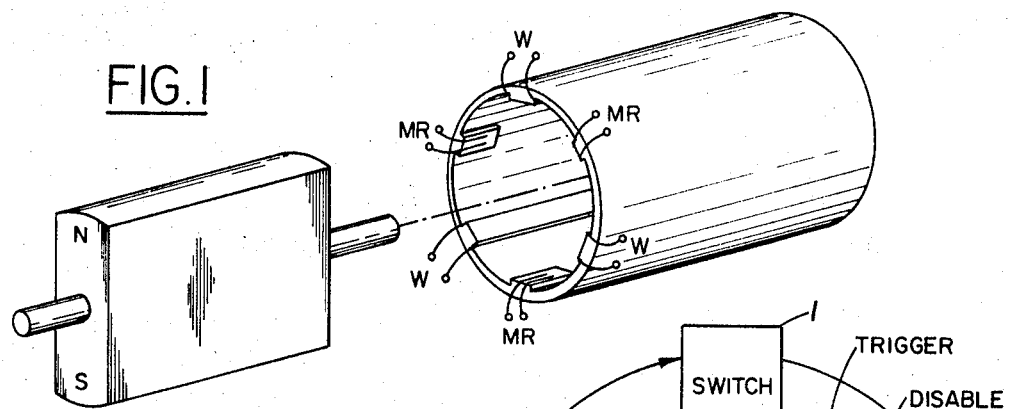
FIG. 1 is a perspective drawing illustrating the physical arrangement of various elements of a motor employing the invention.

FIG. 1 is an exploded perspective view illustrating the physical construction of a motor employing the principles of the present invention. A diametrically magnetized rotor contains north and south poles. The rotor is inserted inside the motor frame during fabrication wherein it is free to rotate in response to currents sequentially flowing in the three stator windings indicated. Three magneto resistors are also mounted inside the motor frame in positions intermediate adjacent stator windings. These magneto resistors are sufficiently small so that they may be inserted directly in the motor frame and still provide clearance for the rotor as it rotates.

Figure 2:
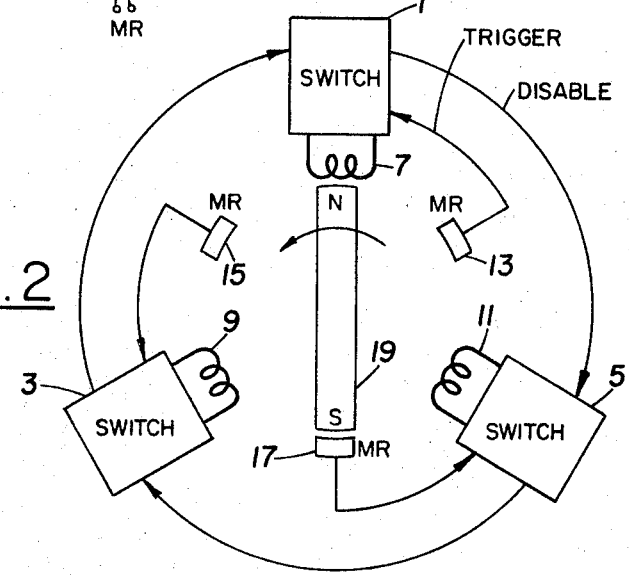
FIG. 2 is a diagram useful in explaining the invention.

FIG. 2 is a diagram useful in explaining the invention. As indicated, three commutating switches 1, 3 and 5 individually control the current flowing through the three stator windings 7, 9 and 11, respectively. The stator windings are spaced at equal intervals around the periphery of the motor frame. Three magneto resistors 13, 15 and 17 provide trigger signals which control the closing of the switches 1, 3 and 5, respectively. In the diagram of FIG. 2, counter-clockwise rotation of the rotor 19 is assumed. Thus it can be seen that a given magneto resistor controls the closing of the next switch in the desired sequence of rotation.

Each switch also contains means to disable the previous switch in the desired sequence, as indicated in FIG. 2. Thus for example, magneto resistor 13 provides a trigger pulse which closes the switch 1. Switch 1, in turn, provides a disable signal when switch 1 is closed which serves to open the preceding switch 5 and maintain this switch in the open condition for an appropriate period of time.

Figure 3:
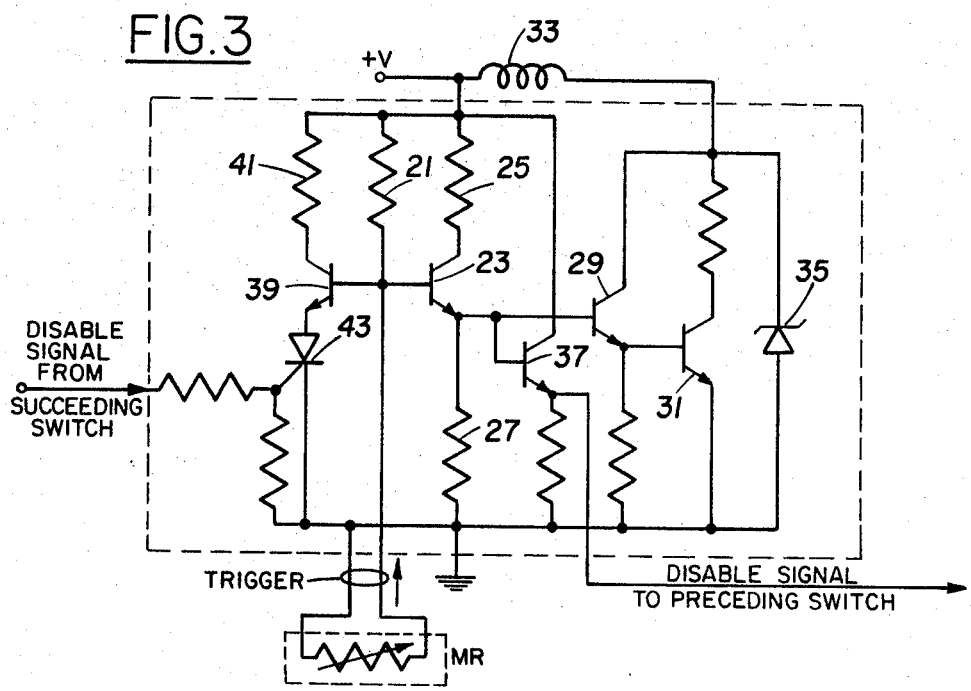
FIG. 3 is a schematic diagram of a commutating switch that may be used in practicing the invention.

FIG. 3 illustrates the circuits used in each of the commutating switches. The switch is energized from an appropriate d.c. source as indicated. The associated magneto resistor is connected in series with a calibrating resistor 21. The junction point between these two resistors is connected to the base electrode of a preamplifier transistor 23. The preamplifier transistor 23 is connected to the voltage source through appropriate collector and emitter resistors 25 and 27, respectively. The emitter electrode of the preamplifier transistor 23 is also connected to drive transistors 29 and 31. The transistors 23, 29 and 31 cooperate to form an amplifying means which serves to pass energizing current through the associated stator winding 33 when the amplifying means is driven into a conducting state, or to block the flow of energizing current to the stator winding when the amplifying means is driven into the cut-off or non-conducting state. A Zener diode 35 is connected across the transistor 31 and its associated collector resistor to protect this transistor from transients.

An auxiliary transistor 37 is also driven from the preamplifier transistor 23. The auxiliary transistor 37 is driven into and out of conduction simultaneously with the transistors 29 and 31. The transistor 37 provides a disable signal that is applied to the preceding switch in the motor.

The circuit of the switch further includes a disabling circuit containing a disabling circuit transistor 39, a series resistor 41, and a controlled rectifier 43. The controlled rectifier, which preferably is a silicon controlled rectifier, is connected to receive a disable signal from the succeeding switch in the sequence of operation.

When the associated magneto resistor experiences a rise in flux density caused by the approach of a magnetic pole, the resistance of the magneto resistor increases thus raising the voltage level at the junction point and eventually causing the preamplifier resistor 23 to conduct and thereby close the switch so as to energize the associated stator winding.

However, if a disable signal is received from a succeeding switch, this signal will fire the controlled rectifier 43 so as to effectively short out the magneto resistor and clamp the base of the preamplifier transistor 23 to ground level. After the disable signal terminates, the controlled rectifier will remain conductive until the magneto resistor decreases in resistance sufficiently to drop the voltage at the junction point below the extinction voltage for the controlled rectifier.

The series resistor 41 is selected so that the extinction voltage at the junction point occurs when the resistance of the associated magneto resistor drops to a sufficiently low level in response to a suitable low flux density. Similarly, the calibrating resistor 21 is selected so that the voltage at the junction point reaches a sufficiently high level to drive the amplifying means into conduction when the resistance of the magneto resistor increases due to a suitably high flux density.

The operation of the motor may be understood by referring to FIG. 2 together with FIG. 3. Assume that the stator windings are each wound so as to attract the north magnetic pole when the winding is energized. Assume further that the rotor is moving in a counter-clockwise direction and is approaching the position wherein the north-south axis is vertical.

At this time, switch 1 will be closed so as to energize stator winding 7. Furthermore, switch 1 will produce a disable signal that clamps the previously energized switch 5 in the open condition. During this time, any trigger signal from the magneto resistor 17 produced by the proximity of the south magnetic pole of the rotor cannot affect the switch 5 since this switch is under control of the disable signal from the switch 1.

As the rotor rotation proceeds, magneto resistor 15 is subjected to increasing flux from the north pole of the magnetized rotor. This causes the resistance of the magneto resistor 15 to increase accordingly. This increase in resistance causes a corresponding increase in the voltage at the junction point in the switch 3 and constitutes a trigger signal that eventually drives the amplifying means in the switch 3 into conduction. In a typical motor, the circuits of FIG. 3 may be designed so that switching occurs when the junction voltage reaches about 2.1 volts and the north pole is within about 60° of the corresponding magneto resistor.

When switch 3 closes, winding 9 is energized and acts to attract the north magnetic pole of the rotor so as to sustain rotation. Closure of switch 3 also drives the auxiliary transistor 37 in that switch into conduction so as to produce a disabling signal which is applied to the controlled rectifier in the preceding switch 1.

This disabling signal fires the controlled rectifier in switch 1 so as to short out any junction voltage that may appear in the switch. Furthermore, at this time the associated magneto resistor 13 is subjected to a low flux density so that the junction voltage is low. These phenomena cooperate to turn off (open) switch 1 and thereby de-energize the stator winding 7.

At this time, magneto resistor 17 is exposed to high flux density from the south magnetic pole. However, the signal from magneto resistor 17 maintains the controlled rectifier in the associated switch 5 in a conducting state so as to clamp the junction voltage in switch 5 at a low level and maintain the amplifier in that switch in a cut-off condition.

In summary, the trigger signal occurring because of the proximity of the south magnetic pole to a magneto resistor is rendered ineffective when the south magnetic pole is approaching the magneto resistor by the action of the disabling circuit. When the south magnetic pole is close to the magneto resistor, but receding, the resultant trigger voltage acts only to sustain the clamping function initiated when the controlled rectifier was originally fired.

When the north magnetic pole subsequently reaches a position of about 30° beyond the magneto resistor 15, the succeeding magneto resistor 17 is exposed to low magnetic flux. The resulting junction voltage in switch 5 becomes too low to sustain the associated controlled rectifier in the conducting state and the controlled rectifier is extinguished.

As rotation continues to the point wherein the north magnetic pole is opposite the stator winding 9, the resistance of the succeeding magneto resistor 17 is rising and that of the magneto resistor 15 is decreasing. Succeeding switch 5 closes shortly thereafter and opens switch 3.

The operation continues in this fashion so as to sustain rotation for as long a period as desired.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A brushless d.c. motor of the type in which a permanent magnet rotor rotates in response to a rotating magnetic field established by individual stator windings disposed around the inner periphery of the motor frame and wound so as to attract a selected magnetic pole of said rotor, said motor comprising individual switching means for energizing a corresponding stator winding in response to a trigger signal, individual magneto resistors coupled to apply trigger signals to a corresponding switching means, each of said magneto resistors being disposed around the inner periphery of said motor frame in a position ahead of the associated stator winding so that a magneto resistor provides a trigger signal when the selected magnetic pole of the rotor approaches the associated stator winding, means in each of said switching means for producing a disable signal when the switching means is closed, means in each of said switching means for clamping the switch in the open condition in response to a disable signal from an adjacent switching means, said magneto resistors being further disposed so that the resistor is exposed to a maximum intensity of flux from the non-selected magnetic pole of the rotor while the associated switching means is clamped in the open condition.

2. The brushless d.c. rotor of claim 1 in which three stator windings are disposed at equal intervals around the motor frame and a magneto resistor is positioned midway between each pair of adjacent stator windings, each magneto resistor being coupled to provide trigger signals to the associated switching means controlling the next adjacent stator winding in the direction of rotor rotation, said associated switching means further being coupled to receive disable signals from the switching means controlling the stator winding positioned diametrically opposite the same magneto resistor.

3. The brushless d.c. motor of claim 2 wherein each switching means includes amplifying means for supplying energizing current to the associated stator winding, voltage dividing means for driving said amplifying means and a disabling circuit, said voltage dividing means including a calibrating resistor and means for connecting the associated magneto resistor in series with said calibrating resistor so that the trigger signals from the associated magneto resistor appear at the junction of the calibrating resistor and the magneto resistor, said calibrating resistor being adjusted so that the amplifying means is driven into conduction when the selected magnetic pole of the rotor reaches a specified angular displacement with respect to the associated magneto resistor.

4. The brushless d.c. motor of claim 3 wherein the specified angular displacement in about 60°.

5. The brushless d.c. motor of claim 4 in which the disabling circuit includes a controlled rectifier circuit connected across said voltage dividing means so as to short out the associated magneto resistor when the controlled rectifier is conducting.

6. The brushless d.c. motor of claim 5 in which the controlled rectifier circuit includes a series resistor, a transistor, and a controlled rectifier in series relationship, said controlled rectifier being effectively shunted across the magneto resistor through said transistor, said controlled rectifier being connected to respond to disable signals from the succeeding switching means in the direction of rotor rotation.

7. The brushless d.c. motor of claim 6 wherein said transistor has a base electrode connected to the junction of said calibrating resistor and the associated magneto resistor, a collector electrode connected through said series resistor to the opposite end of said calibrating resistor, and an emitter electrode connected to the anode of said controlled rectifier, said controlled rectifier further having a cathode connected to the opposite end of said magneto resistor whereby the conduction characteristics of said controlled rectifier are dependent upon said calibrating resistor and the voltage at said junction, said calibrating resistor being selected so that the controlled rectifier is maintained in its conducting state until the voltage at said junction nears its maximum value.

8. The brushless d.c. motor of claim 7 wherein said amplifying means further includes means to produce a disable signal when the amplifying means is supplying energizing current to the associated stator winding.

* * * * *